Oct. 3, 1933.  H. FRÖHLICH ET AL  1,929,201
METER MOUNTING
Filed Dec. 5, 1930
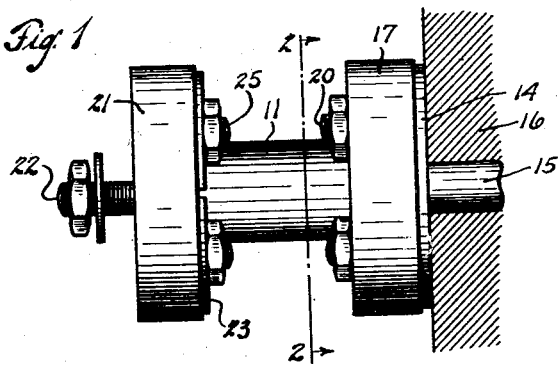
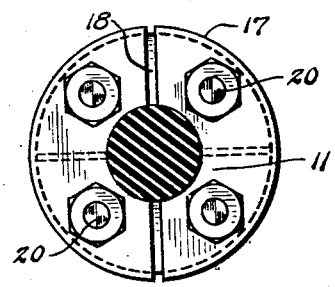
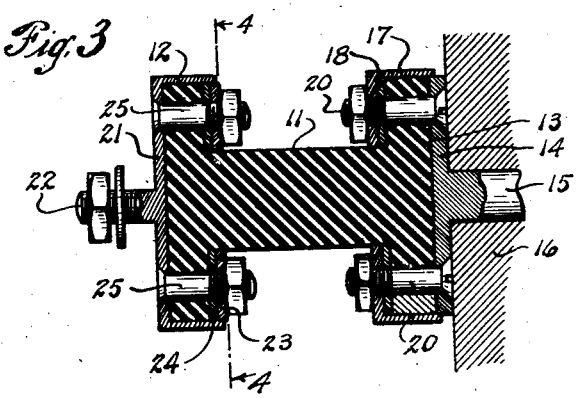
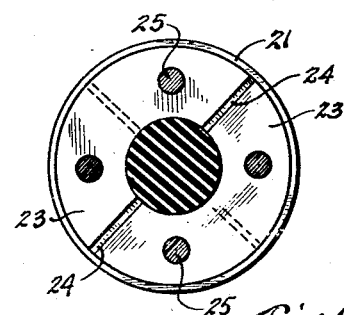
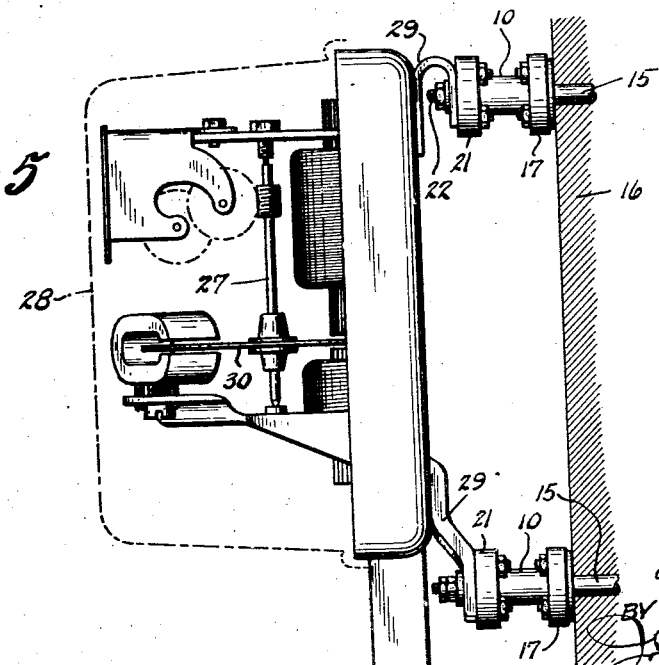
INVENTORS
Hans Fröhlich and
BY Emil Spahn
ATTORNEY Patented Oct. 3, 1933

1,929,201

UNITED STATES PATENT OFFICE 1,929,201

METER MOUNTING

Hans Fröhlich and Emil Spahn, Zug, Switzerland, assignors to Landis & Gyr, A. G., a corporation of Switzerland Application December 5, 1930, Serial No. 500,335, and in Switzerland December 10, 1929

2 Claims. (Cl. 248—30)

The present invention relates to a new and improved mounting for electricity meters and more particularly to mountings for protecting electricity meters which are normally subjected to severe vibration and shock.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrate one embodiment of the invention, and together with the description, serve to explain the principles of the invention.

Of the drawing:—

Fig. 1 is a side elevation of one embodiment of a meter mounting member in accordance with the present invention.

Fig. 2 is a cross section taken on the line 2—2 of Fig. 1.

Fig. 3 is a longitudinal central section through the embodiment shown in Fig. 1.

Fig. 4 is a cross section taken on the line 4—4 of Fig. 3.

Fig. 5 is a side elevation showing an electricity meter employing the mounting of the present invention.

The invention has for its object the provision of an electricity meter which is suitable for use in locations where severe vibrations are present. Another object is the provision of a meter mounting which will electrically insulate the meter from its support. Still another object is the provision of a resilient and insulating meter mounting member which is compact, simple and inexpensive to manufacture and will insure continued accuracy of the meter.

The present invention finds a large field of usefulness in the mounting of electricity meters in electric locomotives, although the invention is in no wise restricted to this use, and will be found of value substantially wherever the meter would otherwise be subjected to severe shocks or stray currents.

Referring now in detail to the present preferred and illustrative embodiment of the invention, the resilient mounting members each comprise a resilient body 10 of generally circular cross section having a reduced central portion 11 and larger end portions 12 and 13, and formed of relatively soft rubber or similar resilient, and preferably electrically insulating material. At one end, the resilient body is provided with a circular disc 14 from which projects outwardly a screw-threaded mounting stud 15 by which the body 10 is securely fastened to the instrument panel 16 or other supporting member for the meter. Disc 14 is preferably of the same size as the flat end surface 13 and fits within the cup-like sheath surrounding the end portion 13. This sheath, in the present embodiment, is formed of a pair of semi-circular pieces 17 which closely fit over the end portion 13 with their line of junction lying at right angles to the line of junction between the compression plates 18 which are positioned between the pieces 17 and the inner surface of the end portion 13. At their centers, pieces 17 and plates 18 are formed with circular openings which fit snugly around the central portion 11 of body 10. For securing disc 14, plates 18 and pieces 17 to the ends 13, suitable threaded members 20 are provided which pass through the ends 13 and the metal parts and press the resilient material.

For securing the other end of the body portion to the meter, the end portion 12 is provided with a metal cup-like member 21 surrounding the end and formed with a projecting threaded mounting stud 22. Two pairs of semi-circular, centrally apertured, metal plates 23 and 24 are provided which surround the central portion 11 of the resilient body and compress the end 12 within the cup 21, and these plates 23 and 24 are preferably staggered so that their lines of juncture are at right angles to each other. For securely fastening the cup 21 to the end 12 and for compressing the end portion, suitable threaded members 25 pass through the end 12 and the metal parts and press plates 23 and 24 towards the outer surface of cup 21.

Fig. 5 shows an electricity meter fastened to an instrument panel in accordance with the present invention, and as embodied, the meter 27 is supported within the usual casing 28 provided on its rear side with the attaching lugs 29. As usual, one lug is provided near the top of the casing 28 and two lugs are provided near either side of the bottom of the casing. These lugs may be slotted, as usual, and receive the threaded members 22 of the resilient mounting members which are securely fastened to the instrument panel in alinement with the slots in the lugs 29.

Where jeweled metering instruments are employed, as in electric locomotives, the resiliency of the mounting members prevents the transmission of damaging shocks to the rotatable element 30, and where the body portions 10 are of rubber or similar material the meter is thoroughly insulated from stray currents which might otherwise produce an erroneous registration.

The invention in its broader aspects is not limited to the specific mechanisms shown and described but departures may be made therefrom within the scope of the accompanying claims without departing from the principles of the invention and without sacrificing its chief advantages.

What we claim is:

1. A resilient meter mounting particularly adapted for use in locations subjected to excessive vibration, which comprises a resilient rubber mounting member having a reduced central portion and larger end portions, means for rigidly connecting one of said end portions to a panel or other meter-carrying support, means rigidly connecting the other of said end portions to a meter-carrying casing, said mounting being so constructed and arranged that the entire weight of the meter is carried through shear stresses in the said rubber member, whereby excessive movement or vibration of said panel or meter-carrying support will be effectively dampened.

2. A resilient meter mounting particularly adapted for use in locations subjected to excessive vibration which comprises a resilient rubber mounting member having a cylindrical central portion and enlarged disk-like end portions integrally connected thereto, means for rigidly connecting one of said end portions to a meter-carrying support including a circular disk and a stud attached thereto adapted to be secured to the said meter-carrying support, a sheath fitting over the said end portion, means for rigidly connecting the said sheath to said disk and means rigidly connecting the other of said end portions to the meter casing, including a cup-like member rigidly connected to said other end portion, a mounting stud connected to said member and an attaching lug connected to said meter casing and adapted to engage said mounting stud.

HANS FRÖHLICH.
EMIL SPAHN.